United States Patent
Leone et al.

(10) Patent No.: US 9,988,994 B2
(45) Date of Patent: Jun. 5, 2018

(54) SYSTEMS AND METHODS FOR EGR CONTROL

(71) Applicant: Ford Global Technologies, LLC, Dearborn, MI (US)

(72) Inventors: Thomas G. Leone, Ypsilanti, MI (US); Michael Howard Shelby, Plymouth, MI (US); Chris Paul Glugla, Macomb, MI (US); Michael Damian Czekala, Canton, MI (US); Daniel Joseph Styles, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1035 days.

(21) Appl. No.: 14/298,733

(22) Filed: Jun. 6, 2014

(65) Prior Publication Data

US 2015/0354477 A1    Dec. 10, 2015

(51) Int. Cl.
*F02P 5/00*    (2006.01)
*F02D 41/00*    (2006.01)
(Continued)

(52) U.S. Cl.
CPC ......... *F02D 41/0002* (2013.01); *F02D 17/02* (2013.01); *F02D 37/02* (2013.01); *F02D 41/0065* (2013.01); *F02D 41/0087* (2013.01); *F02M 26/43* (2016.02); *F02P 5/045* (2013.01); *F02P 5/1504* (2013.01); *F02P 5/1516* (2013.01); *F02D 41/008* (2013.01);
(Continued)

(58) Field of Classification Search
CPC .. F02D 41/0002; F02D 41/0087; F02D 37/02; F02D 41/0065; F02D 17/02; F02D 41/008; F02D 2250/21; F02M 26/43; F02P 5/1504; F02P 5/1516; F02P 5/045; Y02T 10/46; Y02T 10/42; Y02T 10/47
See application file for complete search history.

(56) References Cited

U.S. PATENT DOCUMENTS

| | | | |
|---|---|---|---|
| 4,143,635 A | 3/1979 | Iizuka et al. | |
| 5,279,515 A | 1/1994 | Moore et al. | |

(Continued)

FOREIGN PATENT DOCUMENTS

| | | |
|---|---|---|
| WO | 2012108796 A1 | 8/2012 |
| WO | 2014005127 A2 | 1/2014 |

OTHER PUBLICATIONS

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

(Continued)

Primary Examiner — Hung Q Nguyen
(74) Attorney, Agent, or Firm — Julia Voutyras; McCoy Russell LLP

(57) ABSTRACT

Methods and systems are provided for reducing torque transients experienced when a dedicated EGR cylinder is deactivated to reduce EGR. Before deactivating the dedicated cylinder, an intake throttle position and spark timing of remaining engine cylinders is adjusted to build-up torque reserve in anticipation of a negative torque transient at deactivation. Then, the throttle position or spark timing is adjusted to reduce torque when a positive torque transient is expected.

20 Claims, 5 Drawing Sheets

(51) Int. Cl.
  *F02D 17/02* (2006.01)
  *F02P 5/04* (2006.01)
  *F02D 37/02* (2006.01)
  *F02P 5/15* (2006.01)
  *F02M 26/43* (2016.01)

(52) U.S. Cl.
  CPC ............ *F02D 2041/0012* (2013.01); *F02D 2041/0017* (2013.01); *F02D 2250/21* (2013.01); *Y02T 10/42* (2013.01); *Y02T 10/46* (2013.01); *Y02T 10/47* (2013.01)

(56) References Cited

U.S. PATENT DOCUMENTS

| | | | |
|---|---|---|---|
| 5,746,189 A | 5/1998 | Kuzuya et al. | |
| 5,937,807 A | 8/1999 | Peters et al. | |
| 6,053,154 A | 4/2000 | Pott | |
| 6,138,650 A | 10/2000 | Bailey | |
| 6,230,695 B1 | 5/2001 | Coleman et al. | |
| 6,293,246 B1 | 9/2001 | Tanahashi et al. | |
| 6,394,051 B1 | 5/2002 | Filipe et al. | |
| 6,397,790 B1 | 6/2002 | Collier, Jr. | |
| 6,405,720 B1 | 6/2002 | Collier, Jr. | |
| 6,499,449 B2 | 12/2002 | Michelini et al. | |
| 6,543,230 B1 | 4/2003 | Schmid | |
| 6,655,324 B2 | 12/2003 | Cohn et al. | |
| 6,718,755 B2 | 4/2004 | Brehob | |
| 6,820,415 B2 | 11/2004 | Abet et al. | |
| 6,826,905 B2 | 12/2004 | Gui et al. | |
| 6,918,384 B2 | 7/2005 | Jehlik et al. | |
| 6,925,802 B2 | 8/2005 | Arnold | |
| 6,968,825 B2 | 11/2005 | Hitomi et al. | |
| 7,086,221 B2 | 8/2006 | Pott et al. | |
| 7,290,504 B2 | 11/2007 | Lange | |
| 7,779,812 B2 | 8/2010 | Leone et al. | |
| 7,942,127 B2 | 5/2011 | Leone et al. | |
| 8,041,500 B2 | 10/2011 | Leone | |
| 8,100,116 B2 | 1/2012 | He et al. | |
| 8,108,125 B2 | 1/2012 | Leone | |
| 8,150,605 B2 | 4/2012 | Doering et al. | |
| 8,230,843 B2 | 7/2012 | Kurtz | |
| 8,239,122 B2 | 8/2012 | Leone et al. | |
| 8,240,294 B2 | 8/2012 | Surnilla et al. | |
| 8,291,891 B2 | 10/2012 | Alger, II et al. | |
| 8,352,160 B2 | 1/2013 | Leone | |
| 8,352,164 B2 | 1/2013 | Leone et al. | |
| 8,511,084 B2 | 8/2013 | Ulrey et al. | |
| 8,528,511 B2 | 9/2013 | Price et al. | |
| 8,539,768 B2 | 9/2013 | Hayman et al. | |
| 8,561,599 B2 | 10/2013 | Gingrich et al. | |
| 8,701,409 B2 | 4/2014 | Pursifull et al. | |
| 8,763,570 B2 | 7/2014 | Hayman et al. | |
| 2009/0308070 A1 | 12/2009 | Alger, II et al. | |
| 2011/0041495 A1 | 2/2011 | Yager | |
| 2011/0253113 A1 | 10/2011 | Roth et al. | |
| 2011/0265454 A1* | 11/2011 | Smith | F01N 3/0842 60/274 |
| 2012/0023937 A1 | 2/2012 | Styles et al. | |
| 2012/0078492 A1 | 3/2012 | Freund et al. | |
| 2012/0204844 A1 | 8/2012 | Gingrich et al. | |
| 2012/0260894 A1 | 10/2012 | Hayman | |
| 2012/0260897 A1 | 10/2012 | Hayman et al. | |
| 2012/0285163 A1 | 11/2012 | Hayman et al. | |
| 2012/0285426 A1 | 11/2012 | Hayman et al. | |
| 2012/0285427 A1 | 11/2012 | Hayman et al. | |
| 2012/0323470 A1 | 12/2012 | Klingbeil et al. | |
| 2013/0220286 A1 | 8/2013 | Gingrich et al. | |
| 2013/0276730 A1 | 10/2013 | Borean et al. | |
| 2014/0196703 A1 | 7/2014 | Boyer et al. | |

OTHER PUBLICATIONS

Alger, Terry et al., "Dedicated EGR: A New Concept in High Efficiency Engines," SAE Technical Paper Series No. 2009-1-0694, Southwest Research Institute, 12 pages.

Ulrey, Joseph N. et al., "Dedicated EGR Cylinder Post Combustion Injection," U.S. Appl. No. 13/915,445, filed Jun. 11, 2013, 34 pages.

Leone, Thomas G. et al., "Systems and Methods for Dedicated EGR Cylinder Valve Control," U.S. Appl. No. 14/297,232, filed Jun. 5, 2014, 36 pages.

Martin, Douglas R. et al., "Method and System for EGR Control," U.S. Appl. No. 14/327,379, filed Jul. 9, 2014, 48 pages.

Leone, Thomas G. et al., "Systems and Methods for Improving Operation of a Highly Dilute Engine," U.S. Appl. No. 14/271,248, filed May 6, 2014, 40 pages.

Glugla, Chris P., "Systems and Methods for Boost Control," U.S. Appl. No. 14/307,165, filed Jun. 17, 2014, 56 pages.

Hilditch, James A. et al., "Systems and Methods for Dedicated EGR Cylinder Exhaust Gas Temperature Control," U.S. Appl. No. 14/334,329, filed Jul. 17, 2014, 34 pages.

Hilditch, James A. et al., "Systems and Methods for Exhaust Catalyst Temperature Control," U.S. Appl. No. 14/341,484, filed Jul. 25, 2014, 42 pages.

* cited by examiner

SYSTEMS AND METHODS FOR EGR CONTROL

FIELD

The present description relates to systems and methods for improving EGR transients in engine systems configured with a dedicated cylinder group for providing external EGR to other engine cylinders.

BACKGROUND AND SUMMARY

Engines may be configured with exhaust gas recirculation (EGR) systems to divert at least some exhaust gas from an engine exhaust manifold to an engine intake manifold. 40 By providing a desired engine dilution, such systems reduce engine knock, throttling losses, in-cylinder heat losses, as well as NOx emissions. As a result, fuel economy is improved, especially at higher levels of engine boost. Engines have also been configured with a sole cylinder (or cylinder group) that is dedicated for providing external EGR to other engine cylinders. Therein, all of the exhaust from the dedicated cylinder group is recirculated to the intake manifold. As such, this allows a substantially fixed amount of EGR to be provided to engine cylinders at most operating conditions. By adjusting the fueling of the dedicated EGR cylinder group (e.g., to run rich), the EGR composition can be varied to include species such as Hydrogen which improve the EGR tolerance of the engine and resulting fuel economy benefits.

Various approaches may be used to reduce the EGR rate in such dedicated EGR systems during conditions when EGR reduction is required. One example approach includes the use of diverter valves for diverting some or all of the exhaust from the dedicated EGR cylinder to an exhaust location. However, the use of diverter valves may be cost prohibitive. In addition, they may have durability issues. Another example approach, shown by Geckler et al. in WO2014005127, shuts off fuel to the dedicated EGR cylinder by deactivating the corresponding fuel injector during engine cold-start conditions, and light engine load conditions. By shutting off fuel to the dedicated EGR cylinder during conditions when less engine dilution is required, the EGR rate can be rapidly lowered.

However, the inventors herein have recognized potential issues with the above approach. As an example, the deactivation of the dedicated EGR cylinder may lead to torque unevenness. For example, even after fuel has been shut off in the dedicated EGR cylinder, due to delays in manifold filling, there may be a corresponding delay in purging EGR from the engine intake. As such, until the EGR has sufficiently purged and due to the lost torque from the dedicated EGR cylinder, the torque output of the remaining engine cylinders may be lower than desired. Then, when the EGR has been used from the system, a higher amount of fresh air may be received in the remaining engine cylinders, causing the remaining engine cylinders to generate more torque than desired. In both cases, the EGR variation leads to a torque excursion. As yet another example, the higher amount of fresh air received during the engine cold-start conditions can lead to a delay in catalyst light-off. Further still, if there is a sudden increase in EGR demand, such as due to a tip-in to higher load conditions, even after the fuel injector of the dedicated EGR cylinder has been reactivated, the same manifold filling delay can cause a delay in ramp-up of EGR to the desired EGR rate. As such, until the EGR has been ramped up to the target rate, there may be torque unevenness.

In one example, the above issues may be at least partly addressed by a method for an engine comprising: during an engine warm-up condition, deactivating a dedicated cylinder group configured to selectively recirculate exhaust to remaining engine cylinders; and adjusting one or more of an intake throttle and a spark timing of the remaining engine cylinders to first increase intake throttle opening while retarding spark timing and then decrease intake throttle opening, while advancing spark timing to maintain overall engine output torque. In this way, torque transients incurred while EGR rate from a dedicated EGR cylinder is ramped-up or down, and while a dedicated EGR cylinder is activated and deactivated can be decreased.

As an example, an engine system may be configured with a single dedicated EGR cylinder for providing external EGR to all engine cylinders. During selected conditions where EGR demand is low, such as during an engine cold-start, during a catalyst warm-up, and/or during light engine load conditions, the dedicated EGR cylinder may be selectively deactivated. For example, fuel to the dedicated EGR cylinder may be shut-off via a deactivatable fuel injector. By deactivating the EGR cylinder, the engine dilution provided by the cylinder is reduced. Deactivating the EGR cylinder also results in engine output torque initially decreasing. Then, as the EGR in the intake manifold is used up and replaced with fresh air, the engine output torque increases. To reduce the torque unevenness involved with the deactivation of the EGR cylinder and ensuing change in EGR, before the deactivating, each of an intake throttle and spark timing may be modulated to build-up a torque reserve before the anticipated negative torque transient. Specifically, before the deactivating, an intake throttle opening may be increased to increase intake airflow to the remaining engine cylinders and build up torque reserve while spark timing of the cylinders is retarded from MBT so as to maintain constant engine torque (despite the increase in airflow). At the time of transition, when the dedicated EGR cylinder is deactivated, spark timing may be advanced to MBT to increase torque and provide a smooth torque transition. Specifically, net engine torque is maintained despite the cylinder deactivation. Further adjustments are then used as the EGR is purged from the engine system. Specifically, as the EGR in the intake manifold falls and is replaced with fresh air, the intake throttle and spark timing may be adjusted to avoid excess torque. Specifically, when the intake EGR level is sufficiently low, the intake throttle opening may be decreased (in relation to the EGR) while spark timing of remaining engine cylinders is retarded to decrease cylinder torque output of the remaining engine cylinders. Thus, cylinder aircharge may be initially increased and then decreased during the cylinder deactivation to reduce torque unevenness.

The dedicated EGR cylinder may be reactivated when reactivation conditions are confirmed, such as when the engine and an exhaust catalyst are sufficiently warmed up and further based on input from a vehicle driver (such as pedal input, or transmission gear change input). Similar throttle and spark timing adjustments may be used when the dedicated EGR cylinder is reactivated (by resuming fuel and valve operation in the dedicated EGR cylinder) to reduce torque transients incurred during the reactivation. For example, intake throttle opening (and thereby cylinder aircharge) may be initially decreased while spark timing is retarded to offset the torque increase from the additional firing cylinder, and then throttle opening may be increased while spark timing is advanced back to MBT.

In this way, external EGR can be varied by activating or deactivating a dedicated EGR cylinder while reducing torque unevenness during the activating or deactivating. By adjusting an intake throttle position and a spark timing of all the remaining engine cylinders before deactivating a dedicated EGR cylinder, a torque reserve may be built to counter the torque drop anticipated at the time of dedicated EGR cylinder deactivation. By subsequently adjusting the intake throttle position and the spark timing based on the change in EGR at the intake manifold, a torque surge anticipated when the EGR is replaced with fresh air can be averted. Specifically, the non-dedicated cylinder torque has to increase to compensate for the deactivation of the dedicated cylinder, but as the EGR is purged from the system, the non-dedicated cylinder torque is maintained, not decreased. The throttle may close a little as the EGR is purged, but the mass of fresh air and non-dedicated cylinder torque output is maintained roughly constant. Thus, by first increasing cylinder aircharge and then decreasing cylinder aircharge during the deactivation of a dedicated EGR cylinder, engine output torque can be maintained throughout the deactivation.

Likewise, during the reactivation, torque in the non-dedicated cylinders is decreased when the dedicated EGR cylinder is activated and then be maintained as the EGR is transported through the induction system. Herein, by first decreasing cylinder aircharge and then increasing cylinder aircharge during the reactivation of a dedicated EGR cylinder, engine output torque can be maintained throughout the reactivation. By reducing torque unevenness during conditions when EGR is ramped in or ramped out from a dedicated EGR cylinder, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
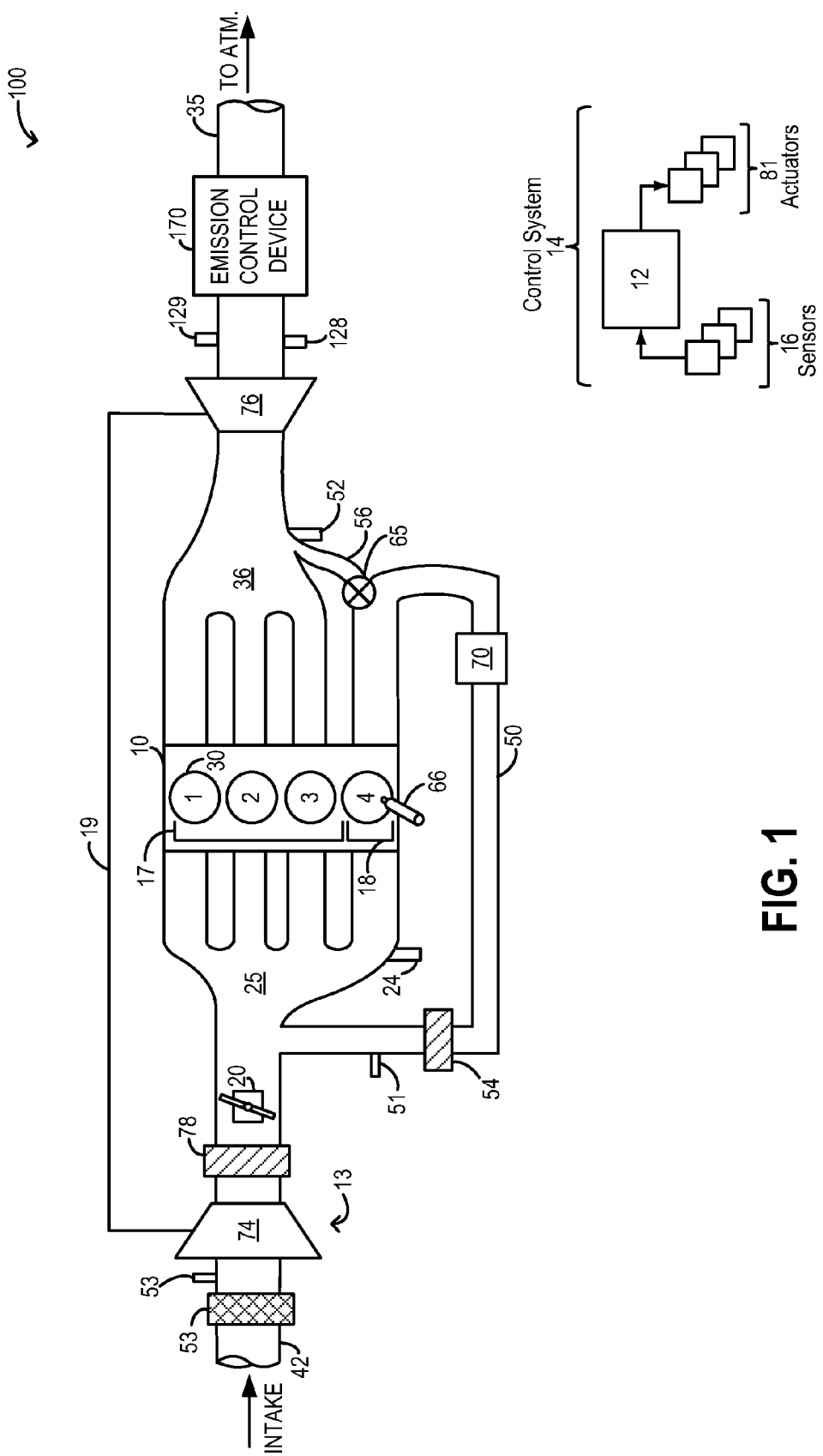
FIG. 1 is a schematic diagram of an engine system including a dedicated EGR donating cylinder group.
Figure 2:
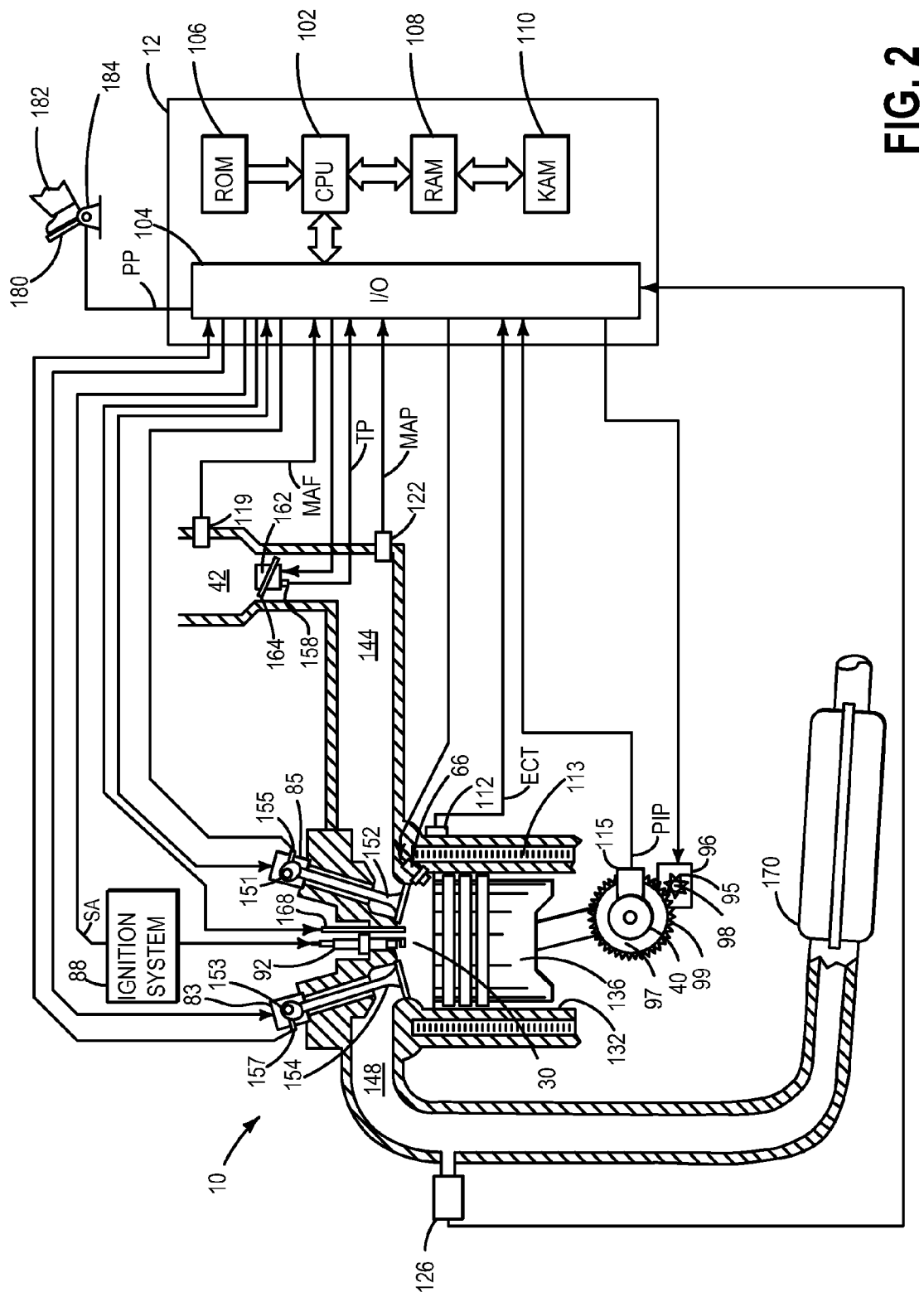
FIG. 2 is a schematic depiction of a combustion chamber of the engine.
Figure 3:
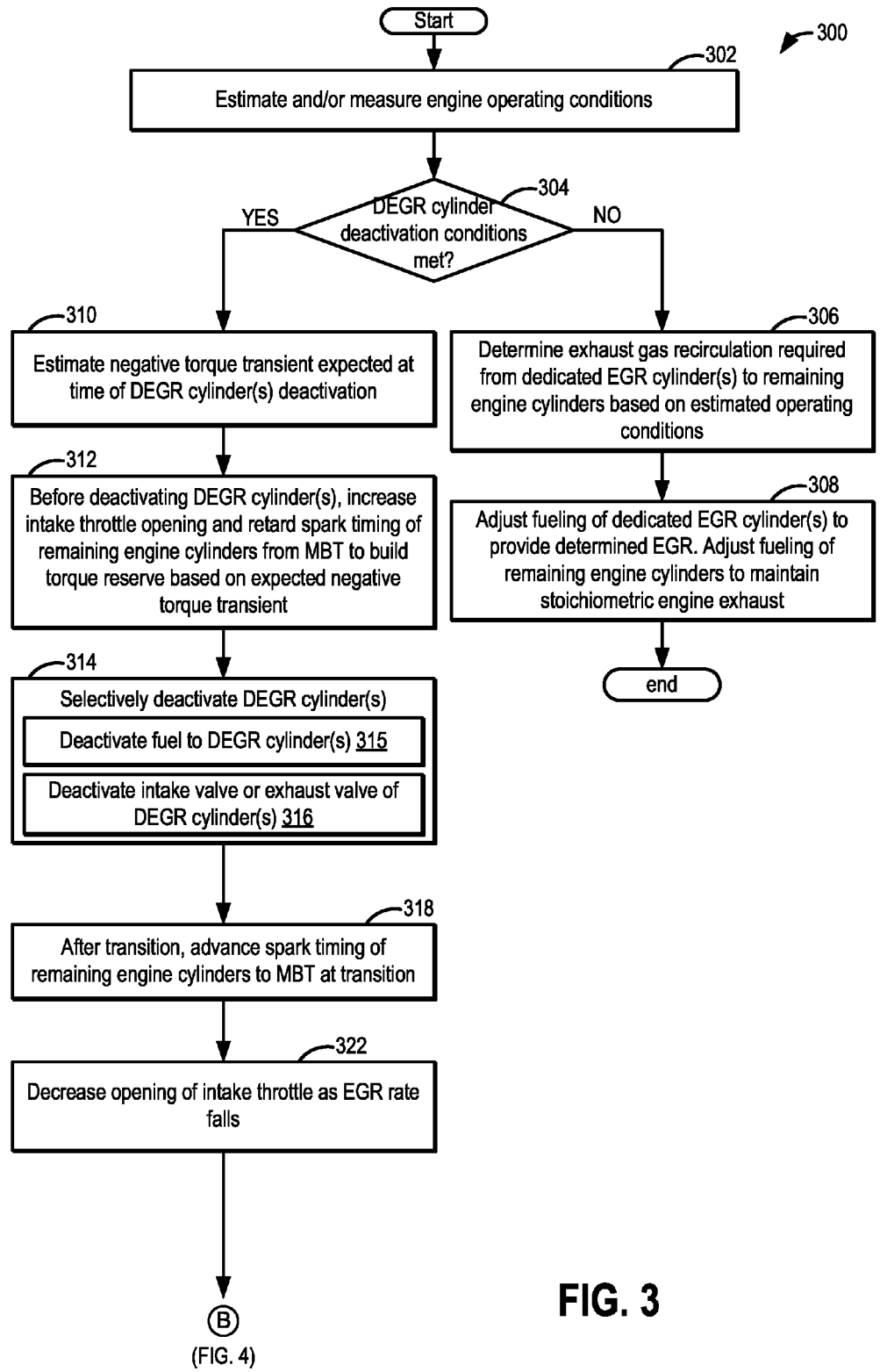
FIGS. 3-4 show an example method for adjusting operation of the engine to vary EGR rate while adjusting operation of one or more actuators to reduce torque transients.
Figure 4:
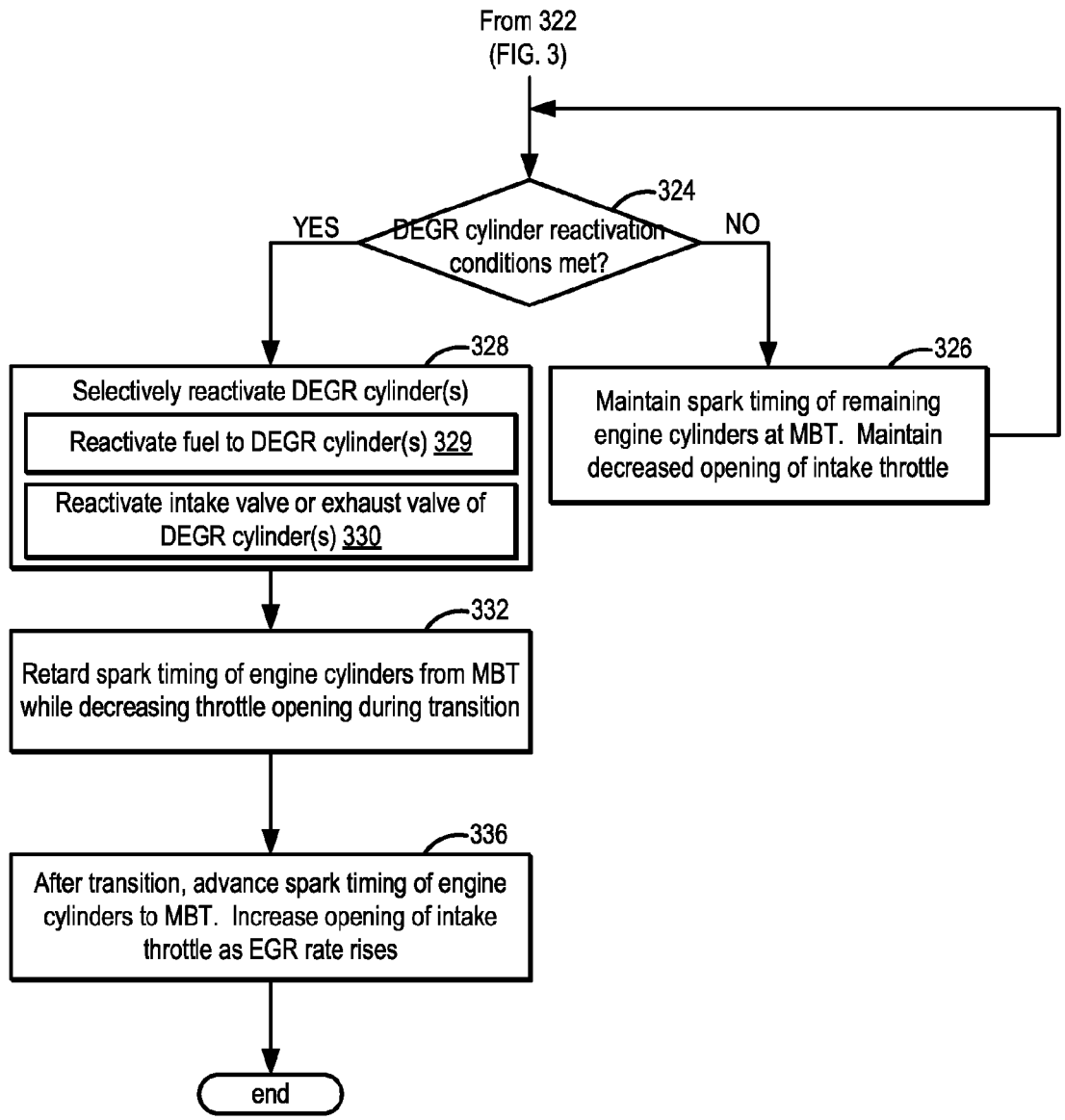

The present description is related to EGR flow control on an engine operating with highly diluted cylinder mixtures, such as the engine systems of FIGS. 1-2. The engine cylinder mixtures may be diluted using recirculated exhaust gases (EGR) that are byproducts of combusting air-fuel mixtures. A controller may be configured to perform a control routine, such as the routine of FIGS. 3-4 to adjust fueling of the dedicated EGR cylinder group in response to an increase or decrease in EGR demand. In addition, the controller may adjust one or more engine actuators, such as spark timing and valve timing, while varying the EGR flow from the dedicated EGR cylinder group to reduce torque transients. An example adjustment for torque transient control is shown with reference to FIG. 5.

FIG. 1 schematically shows aspects an example engine system 100 including an engine 10 with four cylinders (1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 53 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 2). The combustion chambers are further coupled to exhaust manifold 36 via a series of exhaust valves (see FIG. 2). In the depicted embodiment, exhaust manifold 36 includes a plurality of exhaust manifold sections to enable effluent from different combustion chambers to be directed to different locations in the engine system. In particular, effluent from the first cylinder group 17 (cylinders 1-3) is directed through turbine 76 of exhaust manifold 36 before being processed by an exhaust catalyst of emission control device 170. Exhaust from the second cylinder group 18 (cylinder 4), in comparison, is routed back to intake manifold 25 via passage 50, and exhaust catalyst 70. Alternatively, at least a portion of exhaust from the second cylinder group is directed to turbine 76 of exhaust manifold 48 via valve 65 and passage 56. By adjusting valve 65, a proportion of exhaust directed from cylinder 4 to the exhaust manifold relative to the intake manifold may be varied. In some examples, valve 65 and passage 56 may be omitted.

Exhaust catalyst 70 is configured as a water gas shift (WGS) catalyst. WGS catalyst 70 is configured to generate hydrogen gas from rich exhaust gas received in passage 50 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). By recirculating exhaust from one cylinder of the four-cylinder engine to the engine intake manifold, a nearly constant (e.g., around 25%) EGR rate can be provided. Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders.

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the second cylinder group to the remaining engine cylinders. A second exhaust gas sensor 52 may be positioned downstream of the exhaust manifold sections of the first cylinder group for estimating an air-fuel ratio of exhaust in the first cylinder group. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 24, MAF sensor 53, exhaust gas temperature and pressure sensors 128 and 129, and exhaust gas oxygen sensors 51, 52, and crankcase ventilation pressure sensor 62. Example actuators include throttle 20, fuel injector 66, canister purge valve 118, canister vent valve 120, crankcase ventilation valve 28, dedicated cylinder group valve 52, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIGS. 3-4.

Referring to FIG. 2, internal combustion engine 10 comprising a plurality of cylinders as shown in FIG. 1, one cylinder of which is described now. Engine 10 includes combustion chamber 30 and cylinder walls 132 with piston 136 positioned therein and connected to crankshaft 40.

Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

In one example, fuel injector 66 may be a selectively deactivatable fuel injector. Thus, an engine cylinder may be selectively deactivated by turning off fuel to the given cylinder. In the context of the dedicated EGR cylinder (cylinder 4 of FIG. 1), injector 66 fueling the EGR cylinder may be deactivated during selected conditions when EGR demand is low so as to allow for a rapid drop in external EGR from the dedicated cylinder. These may include, for example, conditions when engine load is low (e.g., lower than a threshold load), during an engine cold-start, or during a catalyst warm-up condition. However, torque transients may occur as the EGR falls. Specifically, deactivation of the dedicated EGR cylinder leads to an immediate drop in engine torque. Then, after the EGR has sufficiently purged from the intake manifold, a higher amount of fresh air is received in the remaining engine cylinders, leading to a torque surge. As elaborated herein with reference to FIGS. 3-4, intake throttle and spark timing adjustments may be used during deactivation of the EGR cylinder to first increase cylinder torque (to counteract the initial torque drop) and then decrease cylinder torque (to counteract the subsequent torque surge) so as to maintain engine torque output during the deactivation. Similar adjustments may be used to maintain engine torque during reactivation of the dedicated EGR cylinder.

In some embodiments, the dedicated EGR cylinder may be selectively deactivated by shutting off air instead of, or in addition to, shutting off fuel. For example, either the intake valves or the exhaust valves of the dedicated EGR cylinder may be deactivated. By deactivating either the intake valves or the exhaust valves, the pumping work of the cylinder may be increased, which may be desired during catalyst warm-up. Maximizing pumping work of the dedicated EGR cylinder may also include adjusting cam phasing, valve lift, the position of a port throttle, or a charge motion control device, etc. Alternatively, all valves of the dedicated EGR cylinder may be deactivated when it is desired to reduce EGR without increasing pumping work, for example at low engine loads after the catalyst is warmed up.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 44; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30.

The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-2 provides for an engine system configured to perform a method comprising: during an engine warm-up condition, deactivating a dedicated cylinder group configured to selectively recirculate exhaust to the intake manifold; and adjusting one or more of an intake throttle and a spark timing of the remaining engine cylinders to first increase cylinder torque output and then decrease cylinder torque output (by decreasing intake airflow) to maintain overall engine output torque. For example, the method may include: before deactivating a dedicated cylinder providing EGR to an engine intake responsive to engine load, adjusting each of an intake throttle opening and a spark timing of remaining engine cylinders responsive to the EGR to increase intake airflow while retarding spark timing from MBT; and after the deactivating decreasing intake airflow to the engine while advancing spark timing to MBT, the intake airflow increased and decreased to maintain engine output torque during the deactivation. In this way, torque transients are reduced. Similar adjustments may be used to decrease and then increase intake airflow during reactivation of the dedicated EGR cylinder while spark timing is concurrently adjusted to maintain engine output torque during the reactivation Turning now to FIG. 3, an example method 300 is shown for adjusting parameters of a dedicated EGR cylinder group and remaining engine cylinders of a multi-cylinder engine based on engine operating conditions to maintain torque output even as EGR rate is varied.

At 302, the routine includes estimating and/or measuring engine operating conditions such as engine speed, load, boost, MAP, intake air flow, ambient conditions such as ambient pressure, temperature, humidity, catalyst temperature, etc. At 304, it may be determined if dedicated EGR cylinder group deactivation conditions have been met. As such, the dedicated EGR cylinder group may be deactivated during selected conditions when EGR demand is low. In one example, the dedicated EGR cylinder group may be deactivated during an engine warm-up condition which may include one of an engine cold-start and an exhaust catalyst temperature being lower than a threshold. In another example, the dedicated EGR cylinder group providing EGR to the engine intake may be deactivated responsive to engine load. Specifically, the dedicated EGR cylinder(s) may be deactivated responsive to engine load being lower than a threshold load.

If cylinder deactivation conditions are not met, at 306, the routine includes determining an amount of exhaust gas recirculation (EGR) required based on engine operating conditions. Specifically, an amount of engine dilution required may be determined based on the engine operating conditions, and an EGR rate may be determined based on the required engine dilution. As such, the EGR may be provided by recirculating exhaust from only the dedicated EGR cylinder group (for example, from only cylinder 4 of engine 10 in FIGS. 1-2) to all engine cylinders (to all of cylinders 1-4). At 308, a fueling of the dedicated EGR cylinder group may be adjusted to provide the requirement while fueling of the remaining engine cylinders is adjusted to maintain engine exhaust at or around stoichiometry. In one example, to provide the target engine dilution, the dedicated EGR cylinders may be enriched with a degree of richness of the rich fuel injection adjusted to provide the requested amount of exhaust gas recirculation to the remaining engine cylinders by improving the dilution (EGR) tolerance of the engine. As discussed with reference to FIGS. 1-2, exhaust gas from the dedicated EGR cylinder group is delivered to a waster gas shift catalyst coupled downstream of the dedicated EGR cylinder group before recirculating the exhaust gas to each of the remaining engine cylinders. The water gas shift catalyst uses carbon monoxide and water from the rich exhaust to create extra hydrogen. The hydrogen enriched exhaust is then recirculated to the engine intake. Thus, the hydrogen concentration of the exhaust gas received at the water gas shift catalyst from the dedicated EGR cylinder group is lower than the hydrogen concentration of the exhaust gas recirculated to each of the remaining engine cylinders from the water gas shift catalyst. By recirculating hydrogen rich EGR to the engine, a larger amount of engine dilution can be provided before incurring combustion stability issues. Fuel to each of the remaining engine cylinders is then adjusted based on the air-fuel ratio of the EGR received from the dedicated EGR cylinder group to maintain an exhaust air-fuel ratio of the engine at or around stoichiometry. For example, the remaining engine cylinders may be fueled leaner than stoichiometry as the amount of exhaust gas recirculation received from the dedicated EGR cylinder group increases.

If cylinder deactivation conditions are confirmed, then at 310, the routine includes estimating a negative torque transient expected at the time of deactivation of the dedicated EGR (DEGR) cylinders. As such, a drop in engine output torque is anticipated due to the deactivation of a previously combusting cylinder. At 312, the routine includes, before deactivating the dedicated cylinder(s) providing EGR to the engine intake, adjusting each of an intake throttle opening and a spark timing of remaining engine cylinders to build torque reserve before the deactivation. The torque reserve is built to maintain engine output torque during the transition as the dedicated EGR cylinder is deactivated. The engine intake airflow (and intake throttle opening) may be increased based on the expected negative torque transient associated with cylinder deactivation (e.g., based on the number of cylinders in the dedicated EGR cylinder group being deactivated). Specifically, the adjusting include, before the deactivating, increasing the intake throttle opening (to increase flow of fresh air to the engine intake) while retarding spark timing of the remaining engine cylinders from MBT (so as to maintain constant engine torque despite the increase in intake airflow). The increasing of the intake throttle opening as well as the spark retard applied may be based on the anticipated negative torque transient associated with the EGR upon deactivating of the dedicated EGR cylinder group, and may be performed before the negative torque transient occurs. Then, when the expected negative torque transient occurs, the spark timing may be advanced towards MBT. In doing so, a torque reserve is built up before the negative torque transient that occurs at the time of cylinder deactivation, and then this torque reserve is employed, allowing for engine output torque to be evenly maintained at cylinder deactivation.

It will be appreciated that while the depicted example suggests retarding and then advancing spark timing in only the remaining (non-dedicated EGR) cylinders, in alternate examples, spark timing may be retarded and then advanced in all engine cylinders.

At 314, the routine includes selectively deactivating the dedicated EGR cylinder group configured to recirculate exhaust to remaining engine cylinders. Deactivating the dedicated EGR cylinder group includes, at 315, deactivating a fuel injector of the dedicated EGR cylinder group. Additionally, the deactivating includes, at 316, deactivating the intake valves and exhaust valves of the dedicated EGR cylinder group. Deactivating the intake valves and the exhaust valves includes adjusting (e.g., decreasing) the valve lift via a deactivating roller finger follower, a cam position shifting mechanism, or other mechanism to deactivate the intake valves and the exhaust valves.

At 318, upon deactivation of the dedicated EGR cylinder group, at least the spark timing may be immediately modulated. For example, spark timing may be advanced to MBT (from the retarded timing) during the transition to the deactivated state of the dedicated EGR cylinder group.

As such, following deactivation of the dedicated EGR cylinder group, the EGR rate in the intake may start to decrease as the EGR is used and gradually replaced with fresh intake air. Initially at the deactivation, there may be a negative torque transient. However, once sufficient amount of the EGR has been used up or purged and replaced with fresh intake air, a positive torque transient can be experienced due to higher cylinder torque at the lower EGR levels. Thus, at 322, while maintaining the spark timing at MBT, the opening of the intake throttle may be continuously adjusted based on the EGR rate. Specifically, the opening of the throttle may be decreased as the EGR rate drops so that cylinder aircharge is decreased as EGR is purged out of the engine. The decreasing of intake airflow, and therefore the decreasing of cylinder aircharge, is based on a positive torque transient associated with the (lower) EGR in the engine intake after the deactivating. In this way, the engine torque output is maintained even as the dedicated EGR cylinder is deactivated and as EGR is purged from the engine.

It will be appreciated that since the throttle is a slow torque actuator while spark timing is a fast torque actuator, the two actuators are advantageously used in combination to maintain the engine torque despite the deactivating of the cylinder.

Thus, the controller may first increase engine airflow (and cylinder aircharge) by increasing an opening of the intake throttle while retarding spark timing towards MBT while EGR is above a threshold rate before the deactivating of the dedicated EGR cylinder group, and then when EGR is below the threshold rate after the deactivating of the dedicated EGR cylinder group, the controller may decrease engine airflow (and cylinder aircharge) by decreasing the opening of the intake throttle while advancing spark timing to MBT. In other words, the increasing and decreasing of the intake throttle position, and the retarding and advancing of the spark timing may be based on the cylinder transition and the EGR rate.

It will be appreciated that the decreasing of the intake throttle opening after the deactivating of the dedicated EGR cylinder group may be further based on engine speed. As such, the engine speed affects the rate of EGR purging. Thus, the intake throttle opening may be decreased faster when the engine speed is higher (which is when the EGR is purged faster) and the intake throttle opening may be decreased slower when the engine speed is lower (which is when the EGR is purged slower).

In this way, during an engine warm-up condition, when a dedicated EGR cylinder group is deactivated, a controller may adjust one or more of an intake throttle and a spark timing of the remaining engine cylinders to first increase intake airflow while retarding spark timing (in view of an expected torque drop) and then decrease intake airflow while advancing spark timing (in view of an expected torque surge) to maintain overall engine output torque over the transition to a deactivated state. As discussed above, the adjusting of the intake throttle and the spark timing is based on EGR rate, allowing torque unevenness resulting from the change in EGR to be better anticipated and compensated for.

From 322, the routine proceeds to 324 (at FIG. 4) to determine if dedicated EGR cylinder reactivation conditions have been met. As such, the dedicated EGR cylinder group may be reactivated during selected conditions when EGR demand is high. In one example, the dedicated EGR cylinder group may be reactivated after an engine warm-up has been completed, such as after an engine cold-start is completed or after exhaust catalyst temperature is higher lower than a threshold temperature. In another example, the dedicated EGR cylinder group providing EGR to the engine intake may be reactivated responsive to engine load being higher than a threshold load. The inventors herein have recognized that when dedicated EGR cylinder deactivation is performed for cold-start and catalyst warm-up purposes, reactivating of the dedicated EGR cylinder after catalyst warm-up is complete may cause NVH concerns. For example, at warm idle conditions where the catalyst has warmed up but no input has been received from the vehicle driver, NVH issues may occur when the dedicated EGR cylinder is transitioned back. Therefore, the controller may maintain the dedicated EGR cylinder group deactivated until each of an engine warm-up is completed and a driver input is received. Only after both criteria are confirmed, the deactivated cylinder group is reactivated. As used herein, the driver input may include one of an accelerator pedal being depressed, a transmission gear being engaged, brake pedal being released, and clutch being depressed.

If dedicated EGR cylinder reactivation conditions are not confirmed, at 326, the routine includes maintaining spark timing of the remaining engine cylinders at MBT and maintaining the opening (e.g., decreased opening) of the intake throttle based on EGR. If dedicated EGR cylinder reactivation conditions are confirmed, then at 328, the routine includes selectively reactivating the dedicated EGR cylinder group. Reactivating the dedicated EGR cylinder group includes, at 329, reactivating the fuel injector of the dedicated EGR cylinder group. Additionally, the reactivating includes, at 330, reactivating the intake valves and the exhaust valves of the dedicated EGR cylinder group (specifically, the valves that were previously deactivated).

At 332, the routine includes, during the reactivating, adjusting one or more of the intake throttle position and the spark timing of the remaining engine cylinders to first decrease intake airflow by decreasing the intake throttle position while retarding spark timing. As such, a rise in engine output torque is expected due to the reactivation of a previously deactivated cylinder. Therefore, the intake airflow and cylinder aircharge may be first decreased based on the positive torque transient expected during the reactivation. Specifically, the adjusting includes before and during the reactivating, decreasing the intake throttle opening while retarding spark timing of at least the remaining engine cylinders away from MBT. The spark retard is used to maintain engine torque despite the change in airflow during the transition of the dedicated EGR cylinder to a reactivated state. In an alternate example, the spark timing of all engine cylinders may be retarded from MBT. By retarding spark timing in all engine cylinders, the absolute amount of spark retard required in each cylinder is reduced. The decreasing of the intake throttle opening and retarding of the spark timing may be based on the positive torque transient associated with the EGR upon reactivating of the dedicated EGR cylinder group. For example, as the expected positive torque transient increases, the intake throttle opening may be further decreased. In doing so, excess torque build-up during the reactivation is averted, allowing for engine output torque to be evenly maintained at cylinder reactivation.

Following reactivation of the dedicated EGR cylinder group, the EGR rate in the intake may start to increase as EGR gradually fills up in the intake manifold. Initially after the reactivation, while the EGR rate rises, there may be a positive torque transient. However, once sufficient amount of the EGR has been built up and fresh intake air has been replaced, a negative torque transient can be experienced due to lower cylinder torque at the higher EGR levels. Thus, at 334, after the reactivating (e.g., after a duration since the reactivating), each of the intake throttle opening and the spark timing may be adjusted responsive to the increase in EGR Specifically, the adjusting includes increasing (e.g., slightly increasing) the intake throttle opening while advancing spark timing of all engine cylinders towards MBT after the reactivating. The increasing is based on a negative torque transient associated with the (higher) EGR in the engine intake after the duration since the reactivating. For example, before reactivating the dedicated cylinder, the controller may maintain the decreased intake throttle opening to decrease intake airflow and cylinder charge in anticipation of an increase in torque when the cylinder is reactivated while retarding spark timing from MBT during the transition to maintain constant engine torque despite the change in airflow. Then, after the reactivating, the controller may increase (and then maintain) the intake throttle opening, and advance spark towards MBT as the intake manifold fills with EGR, thereby maintaining engine output torque during the reactivation. In this way, the intake airflow and cylinder charge is adjusted along with spark timing to reduce torque unevenness during the reactivation.

It will be appreciated that the increasing of the intake throttle opening after the reactivating of the dedicated EGR cylinder group may be further based on engine speed. As such, the engine speed affects the rate of EGR filling in. Thus, the intake throttle opening may be increased faster when the engine speed is higher (which is when the EGR is filled in faster) and the intake throttle opening may be increased slower when the engine speed is lower (which is when the EGR is ramped in slower).

It will also be appreciated that while the above example teaches using spark timing and throttle adjustments during the deactivation and reactivation of the dedicated EGR cylinder group to modulate cylinder torque output and maintain engine output torque, in still other examples, torque converter slippage may be used to modulate the engine torque. For example, during the deactivation, torque converter slippage may be initially increased and then decreased. Likewise, during the reactivation, torque converter slippage may be initially decreased and then increased.

One example engine system comprises: an engine including a first and a second cylinder group; an EGR passage configured to recirculate exhaust from only the first cylinder group to an engine intake supplying aircharge to each of the first and second cylinder group; a throttle coupled to the engine intake for varying an amount of aircharge to the cylinder groups; selectively deactivatable fuel injectors coupled to each engine cylinder; a spark plug coupled to each engine cylinder; and a controller. The controller may be configured with computer-readable instructions stored on non-transitory memory for: deactivating fuel to only the first cylinder group during selected conditions. During the deactivating and while an EGR rate is above a threshold during the deactivating, the controller may increase intake throttle opening while advancing spark timing of the second cylinder group towards MBT to increase cylinder charge and intake airflow. Then, while the EGR rate is below the threshold after the deactivating, the controller may decrease intake throttle opening while maintaining spark timing of the second cylinder group at MBT to decrease cylinder charge and intake airflow, the cylinder charge increased and then decreased to maintain even engine torque output while the first cylinder group is deactivated. The selected conditions may include one of an engine cold-start condition, a catalyst warm-up condition, and engine low load condition, and the decreasing of the intake throttle opening after the deactivating may be based on a decrease in the EGR rate after the deactivating. The controller may include further instructions for: selectively reactivating fuel to the first cylinder group when the catalyst warm-up is completed and engine load is higher; and maintaining the decreased intake throttle opening and retarding spark timing of at least the first cylinder group to decrease cylinder output torque until the EGR rate after reactivating the first cylinder group is above the threshold.

In another representation, during conditions when the EGR rate is below the threshold during the reactivating, the controller may decrease an intake throttle opening while retarding spark timing of the active cylinders from MBT to decrease cylinder aircharge and intake airflow. Then, during conditions when the EGR rate is above the threshold after the reactivating, the controller may increase an intake throttle opening while advancing spark timing to MBT to increase cylinder aircharge and intake airflow. In this case, the cylinder aircharge is decreased and then increased to maintain even engine torque output while the dedicated EGR cylinder group is reactivated.

In yet another representation, as an EGR rate rises above a threshold to create a negative torque transient, a controller may retard spark timing of combusting engine cylinders from MBT and increase the opening of an intake throttle based on the negative torque transient to maintain torque output. Then, as the EGR rate falls below the first threshold to create a positive torque transient, the controller may advance spark timing of combusting engine cylinders to MBT and decrease the opening of the intake throttle based on the positive torque transient to maintain torque output.

Figure 5:
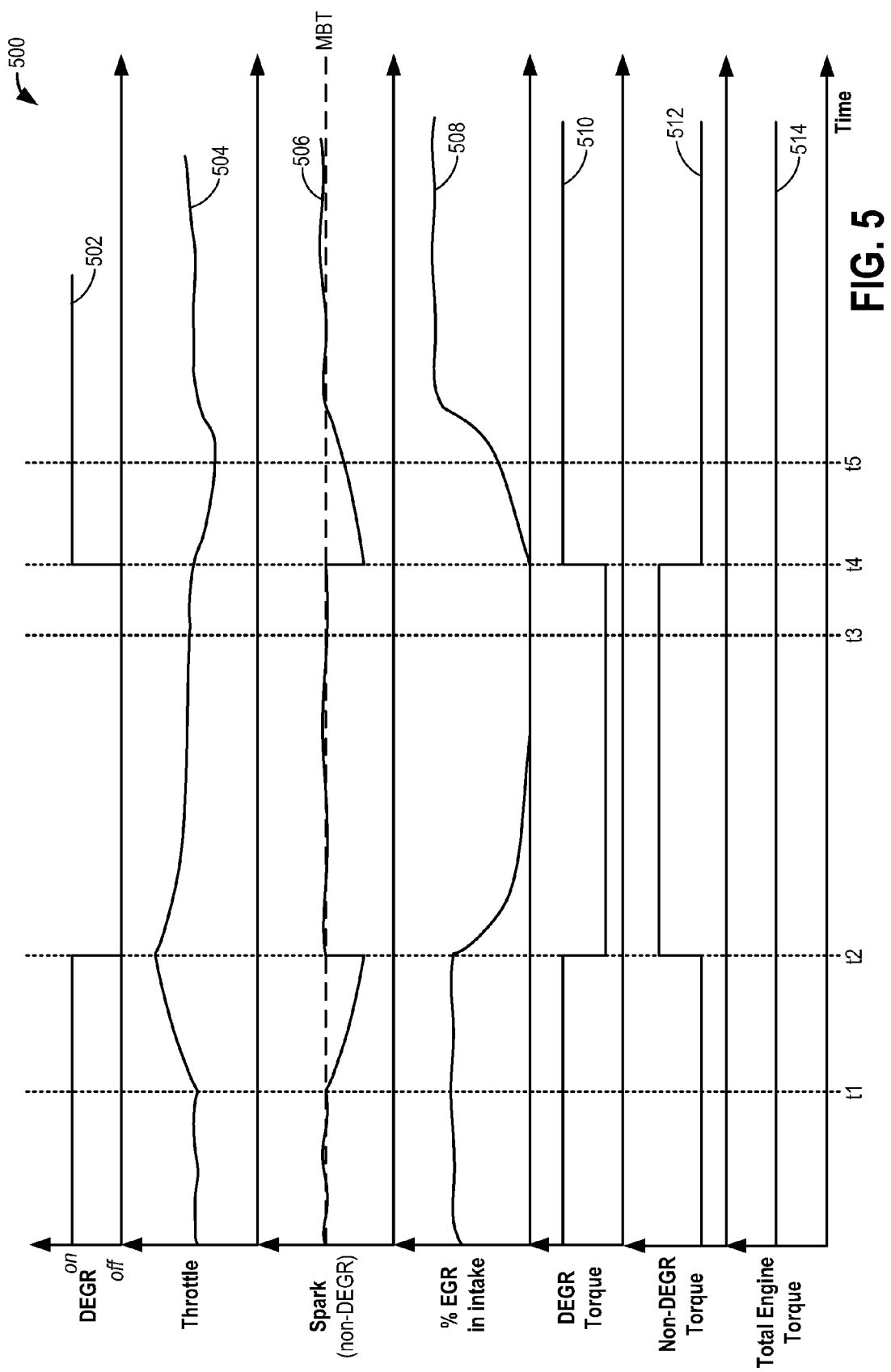
FIG. 5 shows an example spark and throttle adjustment used during deactivation and reactivation of a dedicated EGR cylinder for reducing torque transients.

Now turning to FIG. 5, an example actuator adjustment occurring while a dedicated EGR cylinder is deactivated and reactivated is shown. Map 500 depicts deactivation or reactivation of the dedicated EGR cylinder at plot 502, intake throttle position at plot 504, spark timing at plot 506, and EGR rate (in %) at plot 508. Dedicated EGR cylinder torque is shown at plot 510 non-dedicated EGR cylinder torque is shown at plot 512, and total engine torque is shown at plot 514. Plots are shown over time (along the x-axis).

Prior to t1, the engine may be operating with all cylinders combusting and with exhaust being recirculated from a dedicated EGR cylinder (DEGR) to the engine intake so that EGR is provided from the DEGR cylinders all remaining engine cylinders and the DEGR cylinder. Thus, prior to t1, EGR may be provided at a substantially fixed rate. In addition, throttle opening may be adjusted based on engine load and spark timing of all engine cylinders may be at MBT.

At t1, due to a change in engine operating conditions, it may be determined that a reduction in engine dilution is required. More specifically, a reduction in EGR rate is required at t2. Therefore, deactivation of the DEGR cylinder may be requested at t2. In the depicted example, the DEGR cylinder may be deactivated by deactivating fuel and intake and exhaust valves to the cylinder while continuing to fuel the remaining engine cylinders. During the deactivation, the torque output of the DEGR cylinder (DEGR torque) is decreased while the torque output of each of the remaining engine cylinders (non-DEGR torque) is increased. In anticipation of a drop in engine torque at t2 due to the deactivation of the DEGR cylinder, at t1, before the deactivating, engine intake airflow may be increased to build a torque reserve. In particular, at t1, before the deactivating, the intake throttle opening is increased while spark timing of the non-DEGR cylinders is retarded from MBT. The spark retard allows the engine torque to maintained constant during the transition as intake airflow is increased and the DEGR cylinder is deactivated. The throttle and spark modulation is adjusted so that sufficient torque reserve is built to compensate for the expected negative torque transient at t2, such that overall engine torque is maintained during the transition at t2.

At t2, the DEGR cylinder is deactivated so that the engine EGR rate can be rapidly decreased. Also at t2, spark timing of the remaining engine cylinders is advanced to MBT to maintain the net engine torque despite the deactivating of the DEGR cylinder. In addition, after the deactivating, the throttle opening is adjusted based on the EGR rate to compensate for any torque unevenness. Specifically, as the EGR rate falls and the engine dilution is replaced with fresh air, the intake throttle opening is decreased. The throttle modulation is adjusted so that sufficient cylinder torque is removed to compensate for the positive torque transient expected at the lower EGR rate. This allows the overall engine torque to be maintained as the EGR rate drops.

In this way prior to the transition (herein deactivation), airflow is increased to build up torque reserve. During this process, spark retard is used to maintain constant engine torque (that is, airflow increases, but torque is constant). At the transition, spark is advanced to maintain the net engine torque despite deactivating a cylinder(s). Further throttle adjustments are used as EGR is purged from the system.

While the depicted example shows the intake throttle opening decreased starting at t2, in alternate examples, the intake throttle may be held at the more open position (from before t2) for a number of combustion cycles until the EGR rate has fallen below a threshold rate. Then, below the threshold EGR rate, the throttle may be moved to a less open position, the throttle opening decreased as the EGR rate falls below the threshold rate. Herein, above the threshold EGR rate, a torque drop is expected associated with the deactivation of the DEGR cylinder and the higher EGR rate. Then, below the threshold EGR rate, a torque surge is expected associated with the lower EGR rate (and higher availability of fresh air in the intake). Thus, after a duration since the deactivating at t2, the throttle may be moved towards the more closed position to compensate for the torque surge at the lower EGR rate. Once the EGR rate is sufficiently low, the throttle position may be maintained. Thus, during the DEGR deactivation transition, throttle adjustments are used to first increase and then decrease intake airflow while spark is concurrently first retarded and then advanced so as to maintain engine torque during the transition.

It will be appreciated that while the depicted example shows the DEGR cylinder being deactivated via fuel cut-off and valve deactivation at t2, at t3, due to a change in engine operating conditions, it may be determined that an increase in engine dilution is required. More specifically, an increase in EGR rate is required at t4. Therefore, reactivation of the DEGR cylinder may be requested at t4. In the depicted example, the DEGR cylinder may be reactivated by reactivating fuel and intake and exhaust valves to the cylinder. During the reactivation, the torque output of the DEGR cylinder (DEGR torque) is increased while the torque output of each of the remaining engine cylinders (non-DEGR torque) is decreased.

At t4, the DEGR cylinder is reactivated so that the engine EGR rate can be rapidly increased. Also at t4, spark timing of the remaining engine cylinders (or all cylinders) is retarded from MBT while the throttle is moved towards a more closed position. By decreasing the throttle opening, intake airflow can be decreased to compensate for the positive torque transient associated with the reactivation of the DEGR cylinder. By retarding spark timing at t4 engine torque is maintained constant even as the intake airflow is decreased and the DEGR cylinder is reactivated.

In this way, during the transition (herein reactivation), airflow is decreased to build up torque reserve. During this process, spark retard is used to maintain constant engine torque (that is, airflow decreases, but torque is constant). After the transition, spark is advanced to maintain the net engine torque despite reactivating a cylinder(s). Further throttle adjustments are used as EGR is built up in the system.

In some examples, in anticipation of the surge in engine torque at t4 due to the reactivation of the DEGR cylinder, at t3, before the reactivating, cylinder torque may start to be decreased to avoid excess torque being generated at t4. For example, at t3, the intake throttle opening may be decreased (not shown) while spark timing of the non-DEGR cylinders is retarded from MBT (until t4). The throttle modulation may be adjusted so that sufficient negative torque is built to compensate for the expected positive torque transient at t4, such that overall engine torque is smoothly maintained during the transition at t4.

Spark timing may be adjusted during the reactivation based on the EGR rate. Specifically, as the EGR rate increases and the fresh air in the intake is replaced with engine dilution, the intake throttle opening is slightly decreased (and then maintained) while spark timing is gradually advanced towards MBT. The spark retard upon re-activation is used to offset the torque increase of the additional firing cylinder(s). The throttle then will close slightly to allow spark to be adjusted back to MBT (the throttle may have to re-open some as the EGR comes through the system). Thus, at lower EGR, and soon after reactivation, where engine output torque would otherwise be more than desired, more spark retard is used to maintain engine torque. As the EGR increases, and engine output torque comes closer to the desired torque, spark timing is moved towards MBT. The spark modulation is adjusted so that sufficient cylinder negative torque is put in reserve to compensate for the positive torque transient expected at the lower EGR rate. This allows the overall engine torque to be maintained as the EGR rate rises.

In the depicted example, spark is advanced between t4 and t5 for a number of combustion cycles as the EGR rate is rising towards a threshold rate. Then, still below the threshold EGR rate as the EGR is still filling the intake manifold, at t5, throttle opening may be increased as the EGR rate moves towards the threshold rate. Herein, at the threshold EGR rate, a torque drop is expected associated with the higher EGR rate. Then, at the threshold EGR rate, the throttle may maintained at the more open position to compensate for the torque drop expected at the lower EGR rate. Once the EGR rate is sufficiently high, the throttle position may be maintained. Thus, during the DEGR reactivation transition, throttle and spark adjustments are used to first decrease and then increase cylinder torque so as to maintain engine torque during the transition.

Thus, since the throttle is a slower torque actuator, and spark timing is a faster torque actuator, the two are advantageously used in combination to maintain the engine torque output despite de-activating and re-activating cylinders.

In this way, torque transients can be better managed in a dedicated EGR engine system even as the dedicated EGR cylinder group is deactivated or reactivated to vary engine dilution. By using throttle and spark adjustments, a positive torque reserve can be built during (or prior to) EGR transitions where a torque drop is expected, such as during DEGR cylinder deactivation and at high EGR rates during cylinder reactivation. Likewise, throttle and spark adjustments can be used and to build negative torque reserve during (or prior to) transitions where a torque surge is expected, such as during DEGR cylinder reactivation and at low EGR rates during cylinder deactivation. By using cylinder deactivation on a dedicated EGR cylinder, engine dilution can be rapidly varied in an engine system. By using actuator adjustments to reduce torque transients as EGR is being ramped in to a reactivated dedicated EGR cylinder, or being ramped out of a deactivated dedicated EGR cylinder, engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    during an engine warm-up condition,
        deactivating a dedicated cylinder configured to recirculate exhaust to remaining engine cylinders; and
        adjusting an intake throttle and a spark timing of the remaining engine cylinders to first increase the intake throttle opening while retarding spark timing before deactivation and then after deactivation decrease the intake throttle opening while advancing spark timing coincident with an EGRrate decreasing to maintain overall engine output torque during the deactivation.

2. The method of claim 1, wherein deactivating the dedicated cylinder includes deactivating a fuel injector of the dedicated cylinder.

3. The method of claim 1, wherein deactivating the dedicated cylinder includes deactivating each of an intake valve and an exhaust valve of the dedicated cylinder, the deactivating including decreasing valve lift via one of a deactivating roller finger follower and a cam position shifting mechanism.

4. The method of claim 1, wherein the increasing and decreasing of the intake throttle opening and the retarding and advancing of spark timing is based on the EGR rate.

5. The method of claim 4, wherein the adjusting includes increasing the intake throttle opening while retarding spark timing of the remaining engine cylinders from MBT before the deactivating while the EGR rate is above a threshold rate, and when the EGR rate is below the threshold rate after the deactivating, decreasing the intake throttle opening while advancing spark timing of the remaining engine cylinders to MBT.

6. The method of claim 5, wherein the decreasing the intake throttle opening after the deactivating is further based on engine speed, the intake throttle opening decreased faster as engine speed increases.

7. The method of claim 1, further comprising maintaining the dedicated cylinder deactivated until each of an engine warm-up is completed and a driver input is received, and then reactivating the deactivated cylinder.

8. The method of claim 7, wherein the driver input includes one of an accelerator pedal being depressed, a transmission gear being engaged, a brake pedal being released, and a clutch being depressed.

9. The method of claim 7, wherein the engine warm-up includes one of an engine cold-start and an exhaust catalyst temperature being lower than a threshold, and wherein the engine warm-up is completed when the exhaust catalyst temperature is higher than the threshold.

10. The method of claim 7, further comprising, upon reactivating, adjusting one or more of an intake throttle position and the spark timing of the remaining engine cylinders to first decrease the intake throttle opening while retarding spark timing and then increase the intake throttle opening while advancing spark timing to maintain engine output torque during the reactivation.

11. The method of claim 10, wherein the adjusting is based on the EGR rate, the adjusting including, before the reactivating, decreasing the opening of the intake throttle while retarding spark timing of the remaining engine cylinders from MBT while the EGR rate is below a threshold rate, and when the EGR rate is above the threshold rate after the reactivating, increasing the opening of the intake throttle while advancing spark timing of the remaining engine cylinders to MBT.

12. A method, comprising:
before deactivating a dedicated cylinder providing EGR to an engine intake responsive to engine load, increasing an intake throttle opening while retarding a spark timing of at least remaining engine cylinders responsive to the EGR; and
after the deactivating, decreasing the intake throttle opening coincident with an EGR rate decreasing and responsive to the EGR rate while advancing spark timing to and then maintaining spark timing at MBT, the intake throttle opening increased and decreased to maintain engine output torque during the deactivation.

13. The method of claim 12, wherein deactivating the dedicated cylinder responsive to engine load includes deactivating the dedicated cylinder responsive to engine load being lower than a threshold load, the dedicated cylinder reactivated when engine load is higher than the threshold load.

14. The method of claim 13, wherein decreasing the intake throttle opening after the deactivating is further based on engine speed, the intake throttle opening decreased faster at higher engine speeds.

15. The method of claim 13, wherein retarding spark timing before deactivating includes retarding spark timing from MBT.

16. The method of claim 14, wherein the decreasing of the intake throttle opening after the deactivating is based on a positive torque transient associated with a decrease in the EGR after the deactivating.

17. The method of claim 13, further comprising:
before reactivating the dedicated cylinder, decreasing the intake throttle opening while retarding the spark timing of remaining engine cylinders from MBT responsive to the EGR; and after the reactivating, increasing the intake throttle opening while advancing spark timing of remaining engine cylinders to MBT, the intake throttle opening increased and decreased and the spark timing retarded and advanced to maintain engine output torque during the reactivation.

18. An engine system, comprising:
an engine including a first and a second cylinder group;
an EGR passage configured to recirculate exhaust from only the first cylinder group to an engine intake supplying aircharge to each of the first and second cylinder groups;
a throttle coupled to the engine intake for varying an amount of cylinder aircharge to the cylinder groups;
selectively deactivatable fuel injectors coupled to each engine cylinder;
a spark plug coupled to each engine cylinder; and
a controller with computer-readable instructions stored on non-transitory memory for:
deactivating fuel to only the first cylinder group during selected conditions;
before the deactivating and while an EGR rate is above a threshold after the deactivating, increasing intake throttle opening while retarding spark timing of the second cylinder group from MBT to increase cylinder aircharge; and
while the EGR rate is above the threshold after the deactivating, beginning to decrease intake throttle opening coincident with the deactivation and then continuing to decrease intake throttle opening while maintaining spark timing of the second cylinder group at MBT to decrease cylinder aircharge, the cylinder aircharge increased and then decreased to maintain engine torque output while the first cylinder group is deactivated, wherein the throttle is continuously adjusted based on the EGR rate with the intake throttle opening decreased as the EGR rate drops so that cylinder aircharge is decreased as EGR is purged out of the engine intake.

19. The system of claim 18, wherein the selected conditions include one of an engine cold-start condition, a catalyst warm-up condition, and an engine low load condition, and wherein the decreasing of the intake throttle opening after the deactivating is based on a decrease in the EGR rate after the deactivating.

20. The system of claim 19, wherein the controller includes further instructions for:
selectively reactivating fuel to the first cylinder group when the catalyst warm-up condition is completed and engine load is higher; and
maintaining the decreased intake throttle opening and retarding spark timing of at least the first cylinder group to decrease cylinder aircharge until the EGR rate after reactivating the first cylinder group is above the threshold.

* * * * *